Patented Jan. 11, 1927.

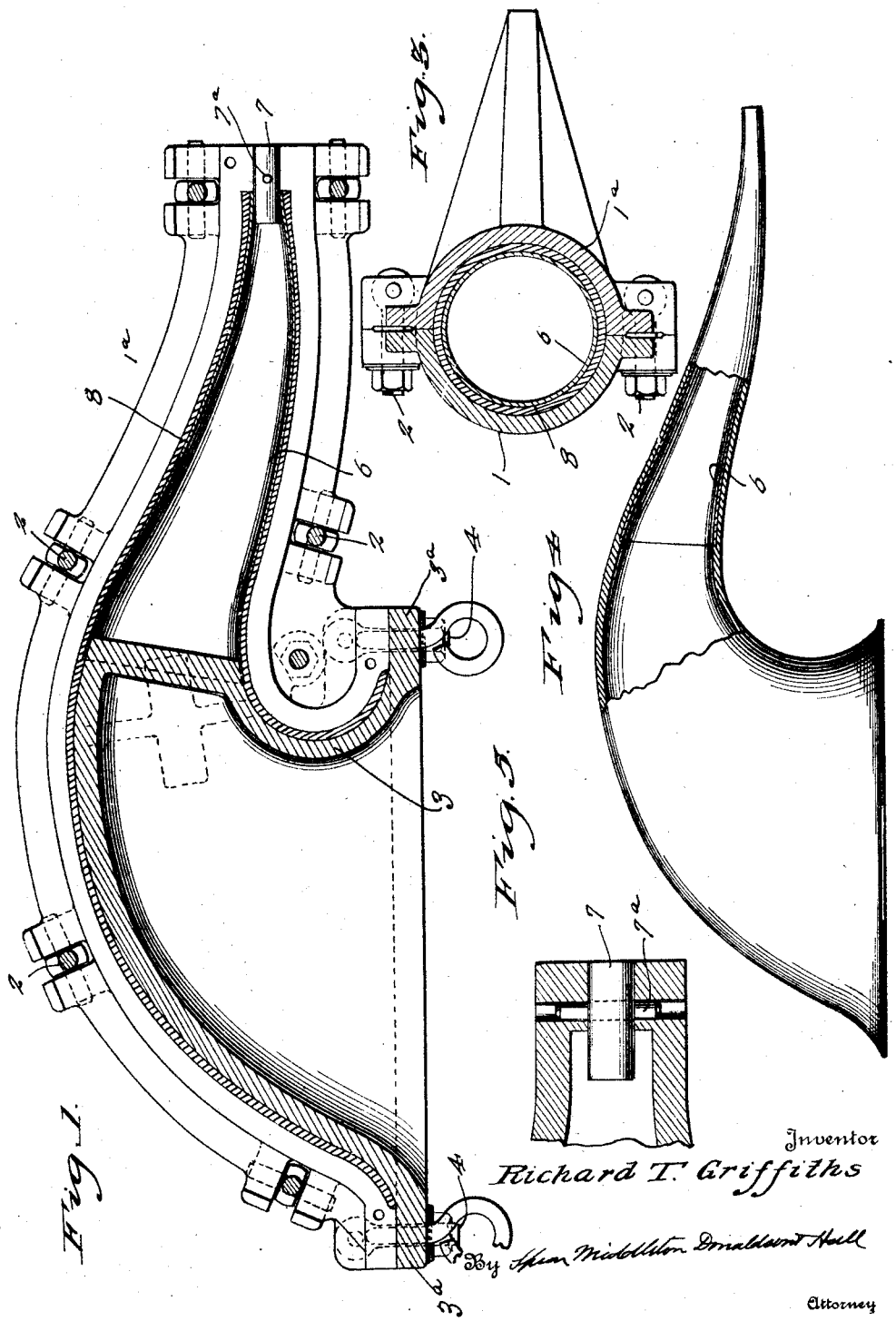

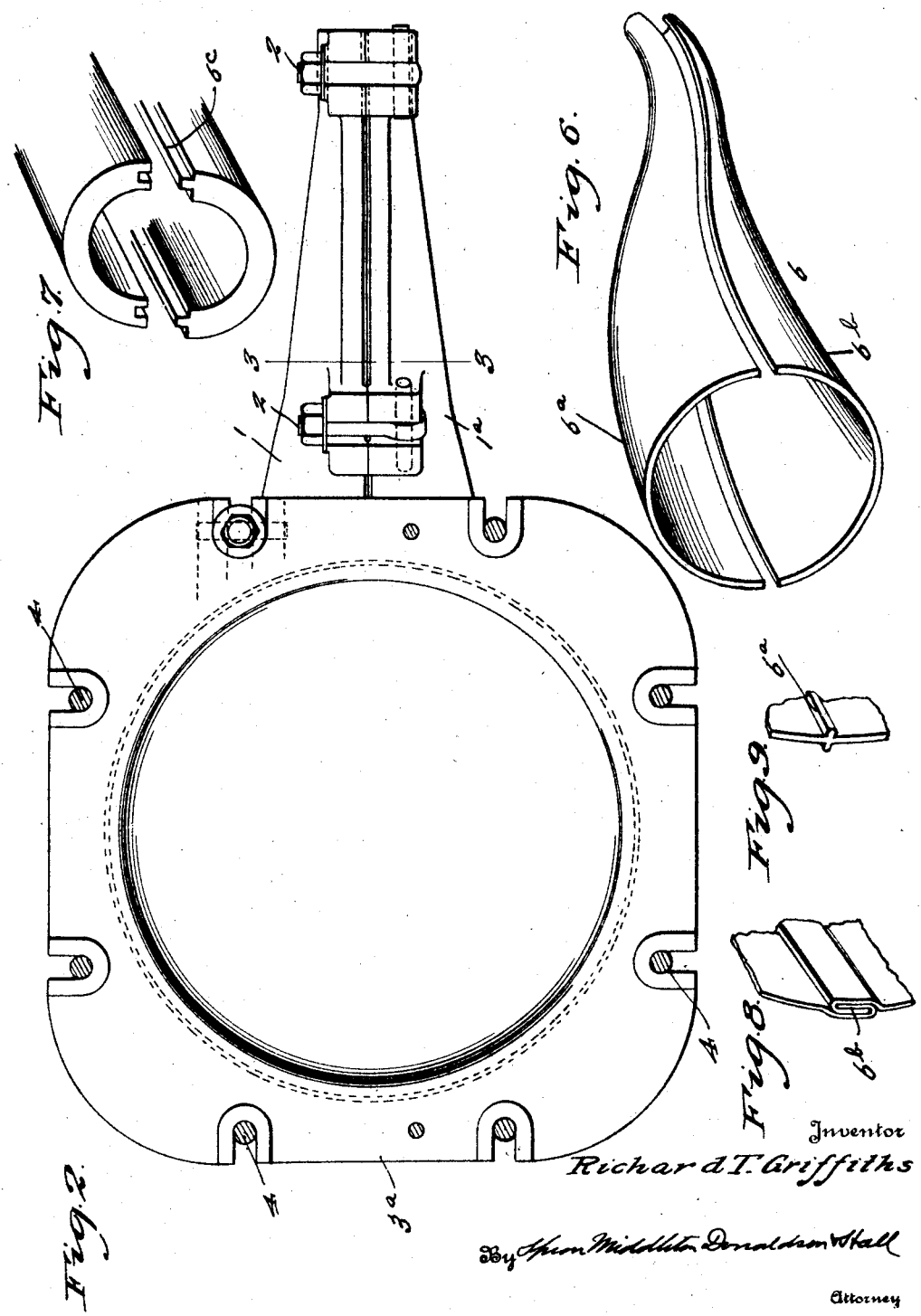

1,613,993

UNITED STATES PATENT OFFICE.

RICHARD T. GRIFFITHS, OF AKRON, OHIO, ASSIGNOR TO THE MILLER RUBBER COMPANY, OF AKRON, OHIO, A CORPORATION OF OHIO.

ARTICLE MADE FROM PLASTIC MATERIAL AND METHOD OF MAKING THE SAME.

Application filed May 2, 1924. Serial No. 710,659.

My present invention relates to the manufacture of tubular rubber articles, and more particularly to the manufacture of resonating horns for use in connection with loud speaking devices, phonographs, or similar sound producing instruments, and the invention includes the novel article and method of making the same herein described, and defined by the appended claims.

It has been found that sound conducting bodies such as horns used on loud speaking devices and phonographs are best when made of such a material that the horn itself does not set up vibrations of its own whereby discordant or distortant sounds would be added to the speech or music which it is the purpose of the conducting body to convey from the vibrating diaphragm to the air in the room. Experiments have shown that when such sound conduits are made of cellular hard rubber, they are particularly free from self-vibration, or the material is of such a nature as to effectually damp such vibrations as might ordinarily originate therein.

This material is prepared in plastic form which when placed in a mold having the shape of the horn and subjected to heat will expand due to the blowing substance contained therein, until the plastic completely fills the molds and, as a vulcanizable plastic is used, vulcanization of this plastic takes place during the expanding process, so that a rigid article completely filling the mold is formed thereby.

These horns are of such peculiar and sinuous shape that great difficulty has been experienced in providing suitable cores which could be removed from the article after it had become hardened or vulcanized, such cores being necessary to properly shape and hold the interior surface of the plastic during vulcanization, and in many forms of horns the shape has been such that it has been found that the shape so complicates the core as to number of parts that it has been impossible to fasten them separably together in a manner to produce a practicable article.

In order that my invention may be better understood, reference is made to the accompanying drawings, in which:—

Figure 1 is a sectional view of a mold such as it is possible to use when employing my process described herein.

Fig. 2 is an elevation.

Fig. 3 is a section on line 3—3 of Fig. 2, and

Fig. 4 is an elevation of the horn partly broken away.

Figs. 5 to 9 are detail views somewhat enlarged or exaggerated for clearness of illustration.

In the drawings above referred to, I have shown a mold such as has been customarily used in producing horns of the character described, which comprises a pair of complementary longitudinally divided sections 1 and 1ª detachably held together by bolts 2. 3 designates a core section for forming the larger flaring end of the horn, from which, due to its large and flaring shape, it is easily removable, this core section having a marginal flange 3ª, which is detachably secured to the corresponding margin of mold sections 1 and 1ª by bolts, or like fastening means indicated at 4.

The portion of the interior of the mold not occupied by the core section 3 must be provided with a core in order to shape and sustain the plastic material and it has heretofore been the practice to supplement said core 3 with additional core sections detachably connected to each other and to the section 3, and this has been found to be a difficult problem, and thus far no practicable solution of the problem has been found.

In order to avoid the above difficulty and make possible manufacture of horns of sinuous shape, I provide a metal reinforcement 6, which may be made from sheet metal in one or more parts, the one I have illustrated being shown as consisting of two parts, 6ª and 6ᵇ, which may be welded together after forming, as shown in Fig. 9 at 6ᵉ, or fastened by any other well known means so as to produce an approximately conical article having the desired sinuosity, and substantially smooth surfaces, as for example by lock seam, as shown at 6 in Fig. 8, or tongue and groove joint, as in Fig. 9 at 6ᶜ.

In the use of this device, the larger end of cone or sleeve 6 is adapted to be slipped over the truncated end of the core 5, thereby forming a hollow extension of the same. The opposite end of the cone 6 may be supported conveniently by supplying a stud 7 removably held in the neck of the mold by a cotter pin 7a. Using this device I now proceed to cover core 5 and the cone 6 as well, with sheets of the plastic material indicated at 8, which are formed thereabout and seamed together in the ordinary or any desired manner, and the core with its hollow extension and plastic material therein may then be surrounded by the mold parts 1, 1a and these bolted together and to the core section. The mold is now ready to be placed in the vulcanizer whereupon vulcanization takes place in the ordinary way. After removal of the mold from the vulcanizer and unbolting the same, it will now be found that the mold sections 1, 1a may be easily removed and the article, together with the hollow conical member or sleeve 6, may be removed as a unitary article from the core section 3. The hollow conical member 6 thus becomes a reinforcement or lining, which remains permanently in the horn forming a part thereof, and as such provides extra strength at the points where horns of this type are most liable to bend under their own weight in warm temperatures.

It will, therefore, be seen that I have provided a horn having a reinforcement which materially strengthens the horn itself and is of further use in enabling the horn to be manufactured without the necessity of a core protruding entirely therethrough. Experiments have shown that such a horn is practically as efficient, as a conveyor of sound, as if it had been made entirely from cellular hard rubber, due to the fact probably that those portions of the horn in which the thickness of the material is comparatively small as compared to the diameter of the air column, are made entirely of cellular hard rubber, whereas those portions of the horn in which the diameter of the air column is small and therefore, the thickness of wall is larger compared therewith, have not as great an effect upon the sound produced.

It will be readily understood that my invention is not necessarily limited to the production of resonating horns, as similar hollow articles to be produced from cellular hard rubber might be made by the same process. It will also be apparent that other plastics might be employed in the manufacture of such articles with equal advantage.

Having thus described my invention, what I claim is:—

1. The herein described method of making hollow articles of plastic material which consists in detachably connecting a core section and a liner section, applying a layer or layers of plastic material to the exterior surface of the core and liner sections, enclosing said plastic layer in a mold, hardening the article while confined in the mold, and thereafter removing the mold and core sections leaving the liner in place in the completed article.

2. The hereindescribed method of making amplifiers of plastic material, which consists in detachably connecting a core section adapted to shape the interior of the larger end of the article to a hollow liner adapted to shape the interior of the balance of the article, applying a layer of plastic material to the exterior surface of the core and liner, enclosing the plastic layer in a mold, hardening the plastic material, and thereafter removing the mold and core sections leaving the liner in place.

3. A horn or amplifier of hardened plastic material having its smaller end portion provided with a lining of non-plastic material permanently united thereto.

4. A horn or amplifier of vulcanized rubber having a metallic liner covering the inner surface of the smaller portion thereof, and permanently secured thereto.

5. A horn or amplifier composed of vulcanized cellular rubber having its neck provided with a sheet metal liner.

6. The method of making goose-necks, consisting in using a partial core associated with a sleeve to complete the core, placing the complete core in a mold, vulcanizing rubber in the mold around the core in the usual manner, removing the partial core, and leaving the sleeve in the goose-neck as an insert.

7. The method of making goose-necks, consisting in using a partial core, slipping a sleeve partly over the core to complete the same, placing the complete core in a mold, vulcanizing rubber around the core in the usual manner, removing the partial core, and leaving the sleeve in the goose-neck.

8. The method of making goose-necks of plastic material, consisting in using a partial core, a sleeve to complete the said partial core, placing the complete core in a mold and placing said plastic material in said mold, or vice versa, removing said partial core when said plastic material has set, and leaving the sleeve in the goose-neck permanently as an insert.

9. A mold for bodies having irregular forms, comprising an exterior shell, a core having a partial core portion removable from the molded body and a sleeve core portion not removable from the said molded body, the two said core portions having a separable joint between them.

10. A mold for bodies have irregular forms, comprising an exterior shell, a core having a partial core portion removable from the molded body and a sleeve core portion not removable from said molded body, the two said core portions having a telescoping joint between them.

RICHARD T. GRIFFITHS.